G. W. GRAHAM.
GLASS KNOB.
APPLICATION FILED JAN. 5, 1909.
936,533.
Patented Oct. 12, 1909.
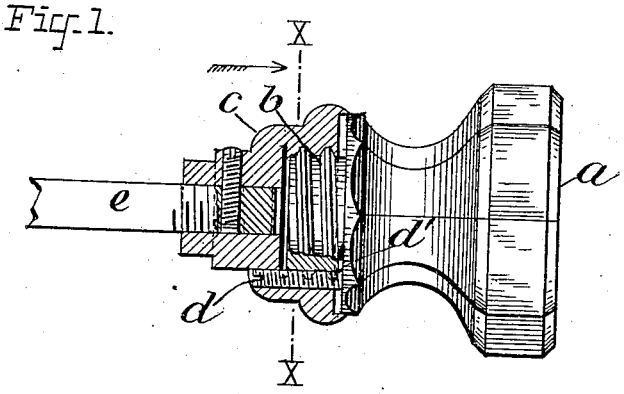
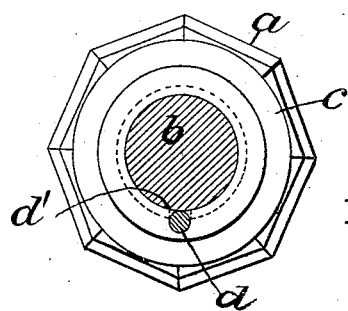
WITNESSES:
C. K. Benwin
Oscar Hoase
INVENTOR
George W. Graham
BY
J. A. Hurdle
ATTORNEY

UNITED STATES PATENT OFFICE.

GEORGE W. GRAHAM, OF ARLINGTON, NEW JERSEY.

GLASS KNOB.

936,533.  Specification of Letters Patent. Patented Oct. 12, 1909.

Application filed January 5, 1909. Serial No. 470,862.

*To all whom it may concern:*

Be it known that I, GEORGE W. GRAHAM, citizen of the United States, and resident of Arlington, in the county of Hudson and State of New Jersey, have invented certain new and useful Improvements in Glass Knobs, of which the following is a specification.

The invention relates to improvements in glass knobs having their shanks secured within a metallic sleeve or socket of which a full clear and exact description will be given herewith.

The invention consists of a glass knob provided with a screw threaded shank the latter provided with one or more grooves; the whole adapted to be combined with a metallic sleeve or socket and other mechanical devices completing the invention. All of which will be fully pointed out in the claim hereinafter.

In the drawings Figure 1. represents a part longitudinal section and elevation of the knob and socket or sleeve. Fig. 2. is a transverse section taken on line X. X. of Fig. 1.

Similar letters refer to similar parts throughout the drawings in which the glass knob $a$. is provided with the properly screw threaded shank $b$. the latter of which is adapted to engage with corresponding threads within the socket or sleeve $c$. the latter of which is provided with a longitudinally arranged groove on the interior thereof and is held rigid in position by means of the longitudinally arranged screw or pin $d$. which screws through the metallic wall of the socket $c$, thence enters into the groove of said socket $c$ and into the groove $d'$ of the screw-threaded shank $b$. The entire knob and socket or sleeve $c$. is secured to the knob spindle $e$. in the usual way as shown in the drawings. It will be observed that by interlocking the knob and socket as shown by this invention reduces the cost of manufacture of glass knobs of this type and produces a perfect commercial article.

Having thus described my invention what I claim as new and desire to secure by Letters Patent is,

The combination with a glass knob having a screw threaded shank integral therewith, and provided with a groove, of an internally threaded metallic sleeve also provided with a groove screwed upon said shank and a screw adapted to engage said grooves, said sleeve constructed to be mounted upon a knob spindle.

Signed at New York city in the county of New York and State of New York this 4th day of January A. D. 1909.

GEORGE W. GRAHAM.

Witnesses:
  C. K. BERWIN,
  IDA LUICES.